United States Patent [19]

Johnson

[11] Patent Number: 4,705,214
[45] Date of Patent: Nov. 10, 1987

[54] INDEPENDENT EXHAUST GAS HEAT SYSTEM

[75] Inventor: Roger L. Johnson, Fort Wayne, Ind.

[73] Assignee: Navistar International Transportation Corp., Chicago, Ill.

[21] Appl. No.: 741,075

[22] Filed: Jun. 4, 1985

[51] Int. Cl.$^4$ .............................................. B60H 1/02
[52] U.S. Cl. .......................... 237/12.3 C; 237/12.3 B
[58] Field of Search .................... 237/12.3 C, 12.3 A, 237/12.3 B, 2 A

[56] References Cited

U.S. PATENT DOCUMENTS 1,095,799  5/1914  Brigel .
1,765,933  6/1930  Miller .
1,928,127  9/1933  Fritz et al. .
2,783,622  3/1957  Bourassa .
3,502,268  3/1970  Miskulin .
4,473,063  9/1984  MacKensen ........................ 126/419

Primary Examiner—Henry A. Bennet
Attorney, Agent, or Firm—F. David AuBuchon; Dennis K. Sullivan

[57] ABSTRACT

An independent heat system for heating a motor vehicle passenger compartment comprises a surge tank feeding the heat transfer medium to a pump which circulates fluid through the cab heater core, heat exchanger and a waste heater core, if necessary. The heat exchanger is connected to an engine exhaust system for heating the circulating medium by the engine exhaust gasses. The heat system can be adapted for heating of a vehicle passenger compartment in any vehicle having no engine water cooling system.

8 Claims, 2 Drawing Figures

INDEPENDENT EXHAUST GAS HEAT SYSTEM

BACKGROUND OF THE INVENTION

The invention pertains to heating systems and more particularly, vehicle heat systems utilizing the engine exhaust gases as a heat source.

Most of the heater or defroster systems use liquid engine coolant as a heat transfer medium. In such instances, the medium is heated as it circulates through the engine. The engine water pump supplies the pressure to circulate the coolant through the system and through the heater or defroster unit. In other words, a conventional heating system of a motor vehicle cab utilizes an engine cooling fluid as a medium for heating the vehicle heater unit.

The subject invention does not utilize an engine coolant as a heat transfer medium. As described in detail hereinbelow, the subject invention utilizes an application of an independent heat system for cooling a passenger compartment of a motor vehicle without utilizing liquid coolant.

SUMMARY OF THE INVENTION

According to the present invention, an exhaust gas heat system for a vehicle passenger compartment cab comprises a surge reservoir supplying a heat transfer medium to a pump which circulates the medium through a heat exchanger and a cab heater core. A valve regulates the flow of the medium to the heat exchanger and the heater core depending on temperature of the medium. An internal combustion engine propelling a vehicle has an exhaust system connected to the heat exchanger for heating the medium passing through the heat system in the exchanger. The system is independent of any engine cooling fluid system and could be used on adiabatic or air cooled engines.

DESCRIPTION OF THE INVENTION

The invention may be carried into practice in a number of ways but two specific embodiments will be described by way of example only.

Figure 1:
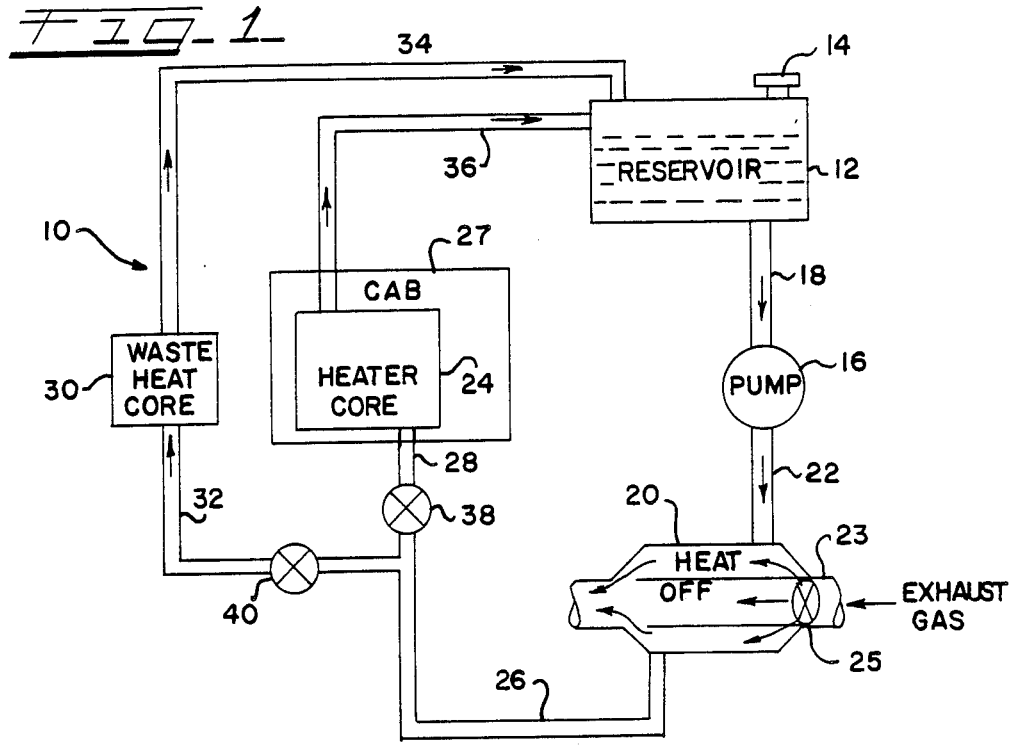
FIG. 1 is a schematic diagram of a first embodiment of the exhaust gas heat system of the present invention.

Referring now to the drawings, wherein reference characters designate like or corresponding parts throughout the several views, there is shown in FIG. 1 an exhaust gas heat system 10. The heat system 10 includes a surge tank or reservoir 12 having a pressure relief cap 14. The surge tank 12 contains a heat transfer medium for the heat system which may be a mixture of ethylene glycol and water or similar liquid. The medium from the reservoir 12 is brought into the circulating pump 16 via a line 18. The pump 16 circulates the medium through a line 22 to an air-to-liquid heat exchanger 20 having its air side connected to the exhaust pipe 23 of the vehicle engine (not shown) preferably in relatively close proximity to the exhaust manifold. A bypass valve 25 may be incorporated in the exhaust pipe either within the heat exchanger 20 or upstream thereof to control the exhaust flow therethrough especially if the heat system is off. The medium exits from the heat exchanger 20 and is circulated to the cab heater core 24 within the cab 27 through lines 26 and 28 and back to the reservoir by line 36. A waste heat core 30 disposed outside the vehicle cab 27 is located in a by-pass line 32 connected to line 26. The fluid exiting from the waste heat core enters the reservoir 12 via lines 34.

Solenoid valves 38 and 40 regulate the entrance of the heating medium either into the heater core 24 or the waste heat core 30 when the temperature of the heating medium reaches a predetermined level. The system may be designed in such a way that the valve 38 lets the medium to pass through the heater core 24 in the vehicle cab 27 during the normal heating operation. However, whenever it is necessary to get rid of an excess quantity of heat passing through the heater core, the valve 38 begins to close and valve 40 opens, thereby diverting medium flow from the heat exchanger 20 into the by-pass line 32. The diverted fluid goes through the waste heat core 30 which is in fact another heat exchanger exposed to the outside environment. The waste heat core 30 dissipates the heat to the atmosphere so that the heat medium will not boil as might occur when the cab heater core is shut off and the pump is shut off or the exhaust gas is particularly hot. The waste heat core 30 dissipates the heating fluid still being circulated by the pump 16.

Figure 2:
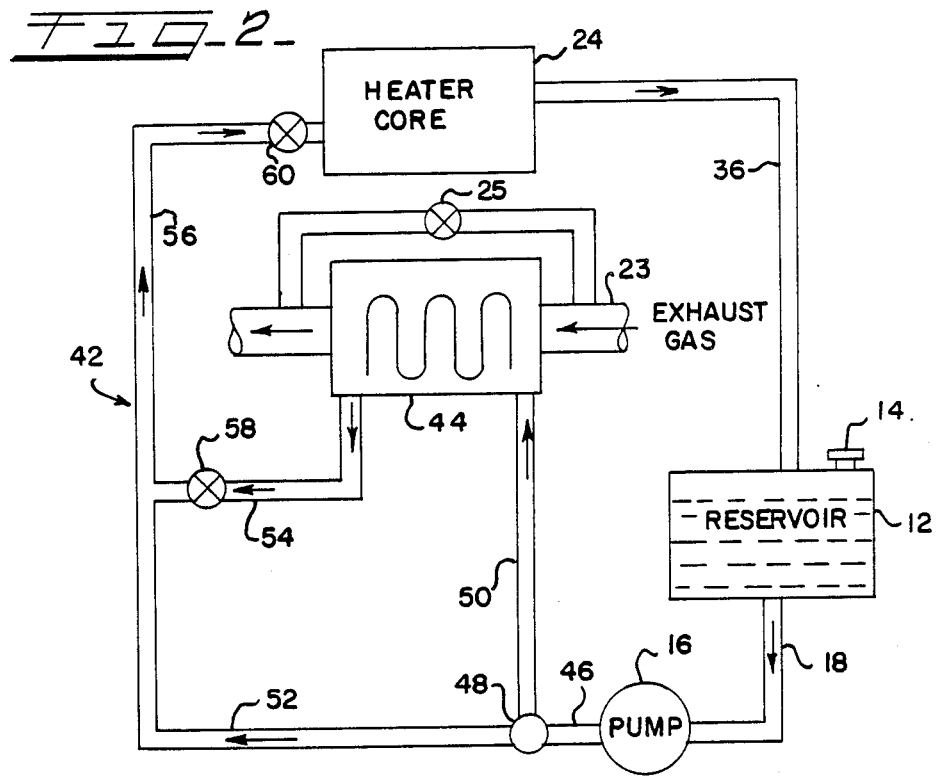
FIG. 2 is a schematic diagram of the invention in another embodiment.

A heat system 42 shown in FIG. 2 represents another embodiment of the subject invention. Similar parts will retain the same reference numerals as in the first embodiment. The heating medium enters the pump 16 through a line 18 and exits from the pump through a line 46 for further circulation through the heat exchanger 44. A thermostatic or solenoid valve 48 responsive to the temperature of the medium regulates the flow of the medium toward the heat exchanger 44 through the line 50 and toward the heater core 24 via the lines 52 and 56. Initially, the thermostat 48 keeps the line 52 closed and the line 50 open so that the medium can enter the heat exchanger through the line 50 and exit through the line 54. When the temperature of the fluid exceeds a predetermined temperature such as 180° F., the thermostat 48 begins to close the line 50 and open the line 52 for circulation of the medium through the heater core 24 via lines 52 and 56. Check valves 58 and 60 prevent the reverse fluid flow from the heat exchanger and the cab heater core, 58 and 60, respectively.

The subject heat system uses engine exhaust gasses passing through the heat exchanger 44 for supplying heat to a heat transfer medium. Utilization of a heat source such as hot engine exhaust gasses generated during the engine combustion process is extremely beneficial for heating of a motor vehicle passenger compartment when said vehicle has an air cooled or adiabatic engine. Such an independent system does away with a conventional liquid engine coolant system in which the coolant circulates through the engine and heater/defroster cab unit. The subject heat system utilizes a conventional cab unit heater which may include a flow control valve incorporated with the check valve 60 and lines communicating with such a unit.

In operation, in the heater "off" mode, the pump 16 is turned off and the solenoid valve or thermostat 48 is closed so the medium may circulate through the heater core 24 but not through the heat exchanger. The medium may boil out of the heat exchanger 44. In the heater "on" mode, the pump is activated, the thermostat or solenoid valve 48 is open and the medium flows through the heat exchanger. At 180° F., the thermostat starts to close off the flow to heat exchanger 44 to maintain a return coolant level at 180° F.

While two embodiments of the invention have been illustrated and described herein, various changes and modifications may be made therein without departing from the spirit of the invention as defined by the scope of the appended claims.

What is claimed is:

1. An exhaust gas heat system for a vehicle passenger compartment comprising:
    a surge reservoir supplying a liquid heat transfer medium to a pump means for circulating said liquid medium through said heat system;
    an internal combustion engine propelling a vehicle and comprising an exhaust system;
    said exhaust system being connected with a heat exchanger for heating siad liquid medium passing through said heat system and said exchanger;
    a heater core disposed to heat the passenger compartment and located downstream of said pump means;
    valve means regulating the flow of said liquid medium to said heater core depending on the temperature of said medium, said valve means maintaining said liquid medium below the boiling point;
    said heat system being independent of any engine coolant fluid system.

2. An exhaust gas heat system for a vehicle passenger compartment comprising;
    a surge reservoir supplying a heat transfer medium to a pump means for circulating said medium through said heat system;
    an internal combustion engine propelling a vehicle and comprising an exhaust sytem;
    said exhaust sytem being connected with a heat exchanger for heating said medium passing through said heat system and said exchanger;
    a heater core disposed to heat the passenger compartment and located downstream of said pump means;
    valve means regulating the flow of said medium to said heater core depending on the temperature of said medium;
    said heat system being independent of any engine coolant fluid system; and a waste heat core exterior of said passenger compartment and located downstream of said heat exchanger for dissipating heat to an ambient environment and cooling off said heat transfer medium.

3. The heat system according to claim 2, and
    said valve means diverting said heat tranfer medium into said waste heat core in order to bypass said heater core.

4. The heat system according to claim 1, and
    a bypass valve operatively associated with said heat exchanger for controlling the flow of exhaust gas therethrough.

5. A heat system according to claim 1, and
    said valve means comprising a thermostat and a check valve.

6. A heat system according to claim 1, and
    said valve means diverting said heat transfer medium into a line bypassing said heat exchanger when said medium reaches 180° F.

7. An exhaust gas heat system for a vehicle passenger compartment and comprising:
    a surge reservoir supplying a heat transfer medium to a pump means for circulating said medium through said heat system;
    an internal combustion engine propelling a vehicle and comprising an exhaust system;
    said exhaust system being connected with a heat exchanger for heating said medium passing through said heat system and said exchanger;
    a heater core being located downstream of said pump means and operatively disposed to heat the passenger compartment;
    valve means regulating a flow of said medium to said heat exchanger and said heater core depending on the temperature of said medium;
    said heat system being independent of any engine coolant fluid system;
    a waste heat core disposed outside the passenger compartment located downstream of said heat exchanger for dissipating heat to the environment and cooling off said heat transfer medium; and
    said valve means diverting said heat transfer medium into said waste heat core in order to bypass said heater core.

8. An exhaust gas heat system for a vehicle passenger compartment and comprising;
    a surge reservoir supplying a liquid heat transfer medium to a pump means for circulating said liquid medium through said heat system;
    an internal combustion engine propelling a vehicle and comprising an exhaust system;
    said exhaust system being connected with a heat exchanger for heating said liquid medium passing through said heat system and said exchanger;
    a heater core being located downstream of said pump means; and,
    temperature responsive valve means regulating the relative flow of said liquid medium to said heat exchanger and said heater core depending on the temperature of said medium, said valve means diverting said heat transfer medium into a line bypassing said heat exchanger when said liquid medium reaches a predetermined temperature below the boiling point of the liquid medium;
    said heat system being independent of any engine coolant fluid system.

* * * * *